(12) United States Patent
Chamberlain

(10) Patent No.: US 7,430,591 B2
(45) Date of Patent: Sep. 30, 2008

(54) METHODS AND ARRANGEMENTS FOR CONFIGURING FUNCTIONAL NETWORKS

(75) Inventor: Robert L. Chamberlain, Raleigh, NC (US)

(73) Assignee: Renesas Technology America, Inc., San Jose, CA (US)

(*) Notice: Subject to any disclaimer, the term of this patent is extended or adjusted under 35 U.S.C. 154(b) by 973 days.

(21) Appl. No.: 10/253,816

(22) Filed: Sep. 25, 2002

(65) Prior Publication Data
US 2003/0079001 A1     Apr. 24, 2003

Related U.S. Application Data

(60) Provisional application No. 60/335,217, filed on Oct. 19, 2001.

(51) Int. Cl.
*G06F 15/177* (2006.01)
(52) U.S. Cl. .......... 709/220; 709/223; 709/224
(58) Field of Classification Search ......... 709/223–224, 709/203, 220, 225, 227, 229
See application file for complete search history.

(56) References Cited

U.S. PATENT DOCUMENTS

| | | | |
|---|---|---|---|
| 5,436,510 A | | 7/1995 | Gilbert |
| 5,471,190 A | | 11/1995 | Zimmermann |
| 5,706,191 A | | 1/1998 | Bassett et al. |
| 5,793,125 A | | 8/1998 | Tarng |
| 5,848,054 A | | 12/1998 | Mosebrook et al. |
| 5,877,957 A | | 3/1999 | Bennett |
| 5,905,422 A | | 5/1999 | Doneghue |
| 6,098,098 A | * | 8/2000 | Sandahl et al. ............ 709/221 |
| 6,112,127 A | * | 8/2000 | Bennett ..................... 700/86 |
| 6,198,479 B1 | | 3/2001 | Humpleman et al. |
| 6,225,915 B1 | | 5/2001 | Lobert |
| 6,275,922 B1 | | 8/2001 | Bertsch |
| 6,480,586 B1 | * | 11/2002 | Hayes et al. ........... 379/102.02 |

(Continued)

FOREIGN PATENT DOCUMENTS

JP     2001-154967     6/2001

(Continued)

OTHER PUBLICATIONS

Japanese Office Action dated Aug. 8, 2006 and English language translation.

*Primary Examiner*—Lashonda T Jacobs
(74) *Attorney, Agent, or Firm*—Buchanan Ingersoll & Rooney PC (57) ABSTRACT

Methods and arrangements for configuring a functional network of devices are presented. The devices are addressable within a logical network operable on a shared physical bus. According to an exemplary method, a configuration session is established between at least one controlling device and at least one controlled device operable within the logical network. The at least one controlling and controlled devices enter respective time-limited configuration modes for an overlapping period of time to establish the configuration session. Linkage transaction messages are exchanged between the at least one controlled and controlling devices during the configuration session. Configuration information included in the linkage transaction messages is stored in memory of the respective at least one controlled and controlling devices during the configuration session. After configuration of the devices is complete, the at least one controlled and controlling devices functionally operate according to the respective stored configuration information.

26 Claims, 4 Drawing Sheets

Figure 1 - Simple Ad-Hoc Powerline Home Network

U.S. PATENT DOCUMENTS

| | | | |
|---|---|---|---|
| 6,823,519 B1 * | 11/2004 | Baird et al. | 719/313 |
| 6,934,269 B1 * | 8/2005 | Hasha et al. | 370/312 |
| 7,027,878 B2 * | 4/2006 | Bennett | 700/14 |
| 7,072,945 B1 * | 7/2006 | Nieminen et al. | 709/217 |
| 2002/0120728 A1 * | 8/2002 | Braatz et al. | 709/223 |
| 2003/0018889 A1 * | 1/2003 | Burnett et al. | 713/153 |
| 2003/0079000 A1 * | 4/2003 | Chamberlain | 709/220 |
| 2005/0091665 A1 * | 4/2005 | Baird et al. | 719/315 |

FOREIGN PATENT DOCUMENTS

| | | |
|---|---|---|
| JP | 2001-274819 | 10/2001 |
| JP | 2001-285308 | 10/2001 |
| WO | WO99/57838 | 11/1999 |

* cited by examiner

Figure 1 - Simple Ad-Hoc Powerline Home Network

Figure 2 - Ad-Hoc Powerline Home Network With A Home Network Controller

METHODS AND ARRANGEMENTS FOR CONFIGURING FUNCTIONAL NETWORKS

RELATED APPLICATIONS

This application claims priority under 35 U.S.C. §119(e) to U.S. patent application Ser. No. 60/335,217, entitled "Functional Network Configuration Method", filed on Oct. 19, 2001, the entire content of which is hereby incorporated by reference.

BACKGROUND

What is described are methods and arrangements for configuring functional networks. In particular, methods and arrangements for configuring functional network connections to establish control and status relationships among devices operating in the network are presented.

Home network is a phrase often used to refer to the last hundred feet of any consumer-related network. Traditionally, home networks have largely been used to interconnect personal computers (PCs) and computer peripheral devices, such as printers and scanners, within the home, so that the resources of the peripheral devices could be shared among PC users. In addition, home networks have enabled PC users to share access to broadband Internet connections that are linked to the network.

Recent advancements in the development of smart devices and appliances are causing a paradigm shift to occur in the public's perception of the home network. These advanced smart devices now allow users to control and monitor events in such devices as consumer-based appliances, home electronics, and home-security systems. Indeed, the sales of non-PC central processing unit (CPU)-powered devices, such as computer games, telephones, personal digital assistants (PDAs), set top boxes, and other consumer goods, now surpass the sales of PCs.

Like most networks, home networks are either built around a shared wired or a shared wireless medium. Popular wired mediums include category 5 twisted-pair (used with Ethernet-based systems), telephone line (or category 3 twisted-pair), broadband cable, and powerline carrier (PLC), which uses AC power lines to carry network information throughout the home. Several wireless (or radio frequency [RF]) transport elements are emerging for home networking, including IEEE 802.11, HomeRF, Bluetooth™, and standard wireless access protocol (SWAP).

Whether wired or wireless, home networks should be simple to configure and should operate reliably over long periods of time. If the configuration process is not maintenance-free, easy to use, and quick to install new devices, it will not likely be embraced by the public. Another consumer expectation of home networks is that no new wires should have to be installed in the home to network together smart appliances, such as washing machines, microwave ovens, and air conditioners. In most households, this limits the possible media upon which the home network can be based to RF or PLC. While nearly every household has telephone wiring installed, access to this wiring is usually limited to three or four access points within the home. In contrast, most household appliances are directly connected to a PLC, and RF transport elements by their very nature require no wiring.

A problem associated with PLC and RF-based home networks is that the media are not physically constrained to a single home or apartment. With RF-based networks, the number of homes and apartments that can share the medium is constrained only by the strength of the RF transmissions and the sensitivity of the smart device receivers. With PLC-based network, the number of homes and apartments that can share the medium is constrained to the number of households physically attached to a common power line transformer. In many cases, a single transformer may service several hundred households.

To address this problem, the individual households sharing a common PLC or RF physical network can each be serviced by respective secure logical networks that only allow smart devices physically existing within the individual home access to the network. The established logical networks should be secure from "attacks" from other devices connected to the shared physical medium. Techniques for establishing such logical networks are described in U.S. patent application Ser. No. 10/253,708, titled "Methods and Apparatus for Configuring Multiple Logical Networks of Devices on a Single Physical Network", filed on the same day, and having a common assignee, as this application, the entire content of which is hereby incorporated by reference.

As the paradigm shift to non-PC-based home networks begins to occur, it is unlikely that homeowners will install traditional networking elements, such as routers, switches, and control points, into the home. Yet, it will be desirable to configure devices operating in the home network to use many of the complex functions and capabilities available with these traditional networking elements.

For example, a homeowner may wish to install a pair of smart switches and a smart power outlet, and then to configure these devices to operate such that a switch, installed at each door of a room of the house, controls a lamp plugged into the smart outlet. Moreover, it would be desirable for the smart switches to be capable of being installed in locations where existing wiring to other fixtures is already in place, but to be configurable to control only those devices connected into the smart outlet.

Conventional techniques for configuring functional networks require a relatively sophisticated device, such as a PC having a user interface, exist on the home network to function as a system controller. With these conventional arrangements, all smart devices attached to the network report their status to the controller. The controller issues commands to devices depending upon the current status of certain devices or upon the physical entry of commands at the system controller.

Consider a simple home network including two smart light switches and a single smart outlet for powering a lamp. The devices are to be configured to allow a switch at each door of a room to control a lamp in that room, commonly referred to as a "three-way" connection. Conventionally, this type of network arrangement includes a system controller, having a user interface, to manage the operation of the devices. For example, typically the three devices report their status, e.g., whether the switch and/or lamp is in an "on" or a "off" state, to the system controller. The system controller is programmed by an operator through the user interface to react to state changes on either of the switches to command a corresponding state change of the lamp. If two or more such simple functional arrangements are desired to operate on the logical home network, the system controller is further programmed to link the states of certain switches to the states of certain lamps, thus preventing a switch from controlling the wrong lamp.

Home networks that require sophisticated system controllers are often referred to as PC-centric or controller-based networks. With relatively simple home networks, such as the arrangement described above, it is undesirable to include a system controller in the arrangement. First, the computational power of the PC or controller is not needed with such arrangements, but adds several hundreds to thousands of dollars to the cost of the home network. Second, typically a relatively highly-skilled person must be employed to carry out the network configuration process using the sophisticated PC or controller.

Accordingly, there exists a need for techniques to easily add new or additional smart devices to the home and to configure these devices to join a functional network with a minimum of interaction and skill from the homeowner. The techniques should be such that newly or additionally installed devices should be configurable to not interfere with the operation of existing household wiring or to override existing wired connections if the homeowner so desires.

SUMMARY

Accordingly, an object is to provide techniques to easily add new or additional smart devices to the home and to configure these devices to join a functional network with a minimum of interaction and skill from the homeowner. Another object is to provide techniques for controlling the operation of functionally networked devices without the need for a sophisticated network controller. These objects are addressed by methods and arrangements for configuring functional network connections to establish and manage control and status relationships among devices operating in the network.

According to one aspect, a method for configuring a functional network of devices, the devices being addressable within a logical network operable on a shared physical bus, includes the step of establishing a configuration session between at least one controlling device and at least one controlled device operable within the logical network, the at least one controlling and controlled devices entering respective time-limited configuration modes for an overlapping period of time to establish the configuration session. Linkage transaction messages are exchanged between the at least one controlled and controlling devices during the configuration session. Configuration information included in the linkage transaction messages is stored in memory of the respective at least one controlled and controlling devices during the configuration session. After configuration, the at least one controlled and controlling devices functionally operate according to the respective stored configuration information.

According to a related aspect, the at least one controlled device advertises available service states to devices operable within the logical network when entering its respective time-limited configuration mode. Also, the at least one controlling device responds to the advertising of available services states by entering its respective time-limited configuration mode within the overlapping period of time, wherein the configuration session between the at least one controlled and controlling devices is established.

According to another related aspect, the at least one controlling device solicits devices operable within the logical network to participate in a configuration session when entering its respective time-limited configuration mode. Also, the at least one controlled device responds to the soliciting by entering its respective time-limited configuration mode within the overlapping period of time, wherein the configuration session between the at least one controlled and controlling devices is established.

According to yet another related aspect, the at least one controlling and controlled devices enter their respective time-limited configuration modes in response to an activation of respective link switches associated each of the devices.

According to still another related aspect, the at least one controlling and controlled devices enter their respective time-limited configuration modes in response to receiving respective commands within the overlapping period of time sent from at least one other device operable within logical network.

According to another related aspect, the at least one other device sends respective linkage transaction messages to the at least one controlled and controlling devices participating in the configuration session. Also, the at least one other device includes configuration information in the respective linkage transaction messages to define the functional operation of the at least one controlled and controlling devices when the configuration session ends.

According to another aspect, a method for controlling the operation of functionally networked devices, the devices being addressable within a logical network operable on a shared physical bus, includes the step of in response to an activation of at least one controlling device operable within a functional network, the at least one controlling device identifying at least one controlled device, operable within the functional network, that the at least one controlling device is configured to control an operational state of. A command message is sent from the at least one controlling device to the at least one controlled device over the shared bus, the command message including command information for controlling the operational state of the at least one controlled device. In response to the receipt of the command message, the at least one controlled device changes to a new operational state based on the command information included in the command message.

According to a related aspect, a status message is sent from the at least one controlled device to the at least one controlling device over the shared bus, the status message including status information identifying a current operational state of the at least one controlled device.

According to another aspect, an arrangement for configuring a functional network of devices, the devices being addressable within a logical network operable on a shared physical bus, is provided. The arrangement includes at least one controlling device and at least one controlled device, each device operable within the logical network and connectable by the shared bus. Logic is included that is configured to enable the at least one controlling and controlled devices to enter respective time-limited configuration modes for an overlapping period of time to establish a configuration session between the devices. A transceiver, included in each of the at least one controlling and controlled devices, is configured to exchange linkage transaction messages between the respective devices during the configuration session. Also, memory included in the respective at least one controlled and controlling devices is capable of storing configuration information included in the linkage transaction messages exchanged during the configuration session. After configuration, the at least one controlled and controlling devices functionally operate according to the respective stored configuration information.

According to still another aspect, an arrangement for controlling the operation of functionally networked devices, the devices being addressable within a logical network operable on a shared physical bus, is provided. The arrangement includes at least one controlling device and at least one controlled device, each device being operable within the logical network and connectable by the shared bus. In response to an activation of the at least one controlling device, logic is configured to identify at least one controlled device that the at least one controlling device is configured to control an operational state of. Also, a first transceiver, included in the at least one controlling device, is configured to send a command message to the at least one controlled device over the shared bus, the command message including command information for controlling the operational state of the at least one controlled device. Logic, included in the at least one controlled device, is configured to change the at least one controlled device to a new operational state based on the command information included in the command message.

It should be emphasized that the terms "comprises" and "comprising", when used in this specification as well as the claims, are taken to specify the presence of stated features, steps or components; but the use of these terms does not preclude the presence or addition of one or more other features, steps, components or groups thereof.

BRIEF DESCRIPTION OF THE DRAWINGS

The above objects, features, and advantages will become more apparent in light of the following detailed description in conjunction with the drawings, in which like reference numerals identify similar or identical elements, and in which.

DETAILED DESCRIPTION

Preferred embodiments are described below with reference to the accompanying drawings. In the following description, well-known functions and/or constructions are not described in detail to avoid obscuring the description in unnecessary detail.

Figure 1:
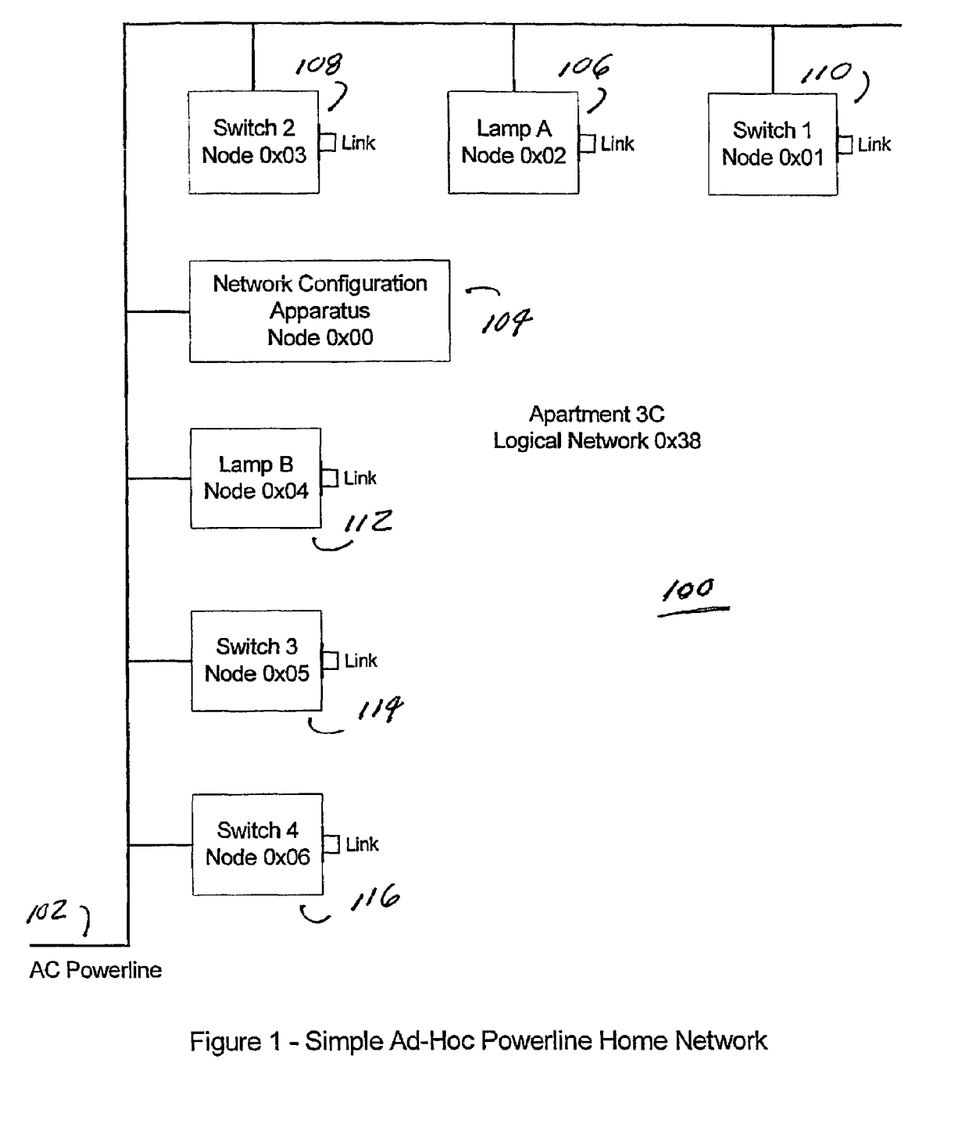
FIG. 1 depicts an arrangement of smart devices operating in a logical network of a PLC-based home network.

FIG. 1 depicts an arrangement of smart devices operating in a logical network 100 of a home network. The arrangement includes a shared bus 102 to which each of the smart devices is physically connected. The shared bus 102 is shown as a PLC, but any of the above-described media may have been depicted. The logical network 100 corresponds to a physical dwelling (an apartment is arrangement shown), but this need not be the case.

The arrangement further includes a network configuration apparatus (NCA) 104 that is also connected to the shared bus 102. As described in detail in U.S. patent application Ser. No. 10/253,708, the NCA 104 is a device that may be used to configure a logical network of smart devices connected to a shared bus 102. The shared bus 102 may (and often does) extend beyond the physical boundaries of a dwelling. The NCA 104 is capable of establishing a logical network 100 on the shared bus 102, and then configuring a group of devices connected to the bus 102 to exchange information in a secure manner within the network 100, to the exclusion of other devices that may be connected to the shared bus 102. The NCA 104 accomplishes this task by assigning a unique network number to the logical network 100, and then by assigning logical addresses to each of the devices that are used to exchange information with other devices configured to operate within the network 100. As further described in the above-cited application, the NCA 104 may generate and assign network encryption keys for use by the devices to ensure the secure exchange of information within the logical network 100.

As shown in FIG. 1, the NCA 104 has assigned a network number to the logical network 100 of 0x38. In addition, each of the devices connected to the shared bus 102 have been assigned a unique (although this need not be the case) node address, e.g., 0x00 through 0x06. According to U.S. patent application Ser. No. 10/253,708, the logical address of each device may be formed by combining the network number of the logical network 100 with the corresponding node address of the respective device.

The smart devices depicted in FIG. 1 may be grouped into two classes of devices: (1) controlling devices, and (2) controlled devices. It will be understood that other types of devices may be said, under certain conditions, to operate in both of these device classes. According to a preferred embodiment, each class of device is capable of performing a different set of network commands once configured. For example, according to a preferred embodiment, a controlling device has a single function, namely to issue state-change commands to certain controlled devices existing on the logical network 100. A controlled device's primary function is to change its current operating state in response to receiving state-change commands from controlling devices. In addition, a controlled device may issue state-change status to at least one of the devices configured to control its operation. By grouping devices into two classes, a relatively simple linkage protocol may be established to allow devices to operate collectively in a functional network without the need for a sophisticated network controller.

FIG. 1 shows four controlling smart devices, i.e., switches 1-4, and two controlled smart devices, i.e., lamps A and B. Each smart device includes circuitry to enable it to communicate with other devices connected to the shared bus 102. For example, the devices will typically include a physical layer (PHY) interface for exchanging information over the bus 102. The devices may also include media access control (MAC) circuitry for exchanging logical information with the other devices connected to the shared bus 102. Together, the PHY and MAC functions are typically referred to as a transceiver. MAC information may be exchanged according to the transmission protocol (e.g., Ethernet, ATM, or 802.11(b)) used to send information over the bus 102. While the design of specific PHY and MAC circuitry is beyond the scope of this document, those skilled in the art will understand how to incorporate the smart device linkage functionality described below into such designs.

According to a preferred embodiment, when a smart device is first connected to the shared bus 102, it does not "belong" to any functional network of devices. Instead, the smart device "waits" until some triggering event occurs to perform linkage transactions with other devices on the network 100, but this need not be the case. The triggering event may be generated by circuitry, included within the devices, that is responsive to a number of device-related and/or environmental conditions. For example, the triggering event may occur automatically after a set period of time elapses from the time the device is first attached to the PLC. Alternatively, the device may include circuitry that monitors network traffic on the bus 102 and then searches for information in the traffic to initiate the triggering event. This information may include, but is not limited to, indications that new devices have been connected to the shared bus, or instructions sent from network controllers that may be connected to the shared bus 102.

According to an exemplary embodiment, the smart devices include link switches that may be used to initiate the triggering event. When closed, the link switches enable the devices to enter into a configuration mode. Whenever at least one controlling and at least one controlled smart device are simultaneously operating in their respective configuration modes, they enter into a configuration session, during which the devices perform linkage transactions to define their collective operation. When the configuration session is completed, the devices operate in a functional network according to the "agreed upon" linkage transactions.

The devices preferably remain in their respective configuration modes only for a limited period of time, e.g., five seconds, after their respective link switches are closed. If a device does not enter into its configuration mode while another device is operating in its configuration mode, a configuration session between the devices will not be established. While, strictly speaking, the devices may operate in a "configuration mode" during the configuration session, the phrase "configuration mode" in this document refers to the limited time period that the devices operate in when capable of participating in, but just prior to entering, a configuration session.

Either a controlling or a controlled smart device may initiate a configuration session established between the devices. For example, suppose it is desired to form a functional network among the controlling devices Switch 1 110 and Switch 2 108, and the controlled device Lamp A 106, shown in FIG. 1 The desire is to form a three-way switch operation among these devices, wherein the Lamp A 106 may be turned on and off by either of the Switches 1 and 2 110,108.

According to an exemplary embodiment, the configuration session may be initiated by activating the link switch on the controlled device, Lamp A 106 in this example, causing the device to advertise its service states, e.g., lamp on/off, on the network. The controlled device Lamp A 106 includes its logical address in the service advertisement. At least one of the controlling devices, e.g., Switch 1 110 and Switch 2 108, may participate in a configuration session with the controlled device Lamp A 106 by entering into its respective configuration mode. This can occur either in response to the respective at least one controlling device Switch 1 110/Switch 2 108 detecting the advertisement sent by the controlled device in the traffic carried over the bus 102, or in response to the respective at least one controlling device's link switch being closed. As described above, the at least one controlling device Switch 1 110/Switch 2 108 must enter its configuration mode while the controlled device Lamp A 106 is operating in its configuration mode, or the configuration session will not be established.

Alternatively, at least one of the controlling devices Switch 1 110/Switch 2 108 could solicit controlled devices, such as Lamp A 106, to enter into a configuration session in response to the link switch of the respective at least one controlling device being activated. The controlled device Lamp A 106 may then participate in a configuration session with the at least one controlling device Switch 1 110/Switch 2 108 by entering into its configuration mode. This can occur either in response to the controlled device Lamp A 106 detecting the solicitation sent by the at least one controlling device Switch 1 110/Switch 2 108 in the traffic carried over the bus 102, or in response to the controlled device's link switch being closed. As described above, the controlled device Lamp A 106 must enter its configuration mode while the at least one controlling device Switch 1 110/Switch 2 108 is operating in its configuration mode, or the configuration session will not be established.

While participating in the configuration session, the devices use their circuitry for communicating over the bus 102 to exchange linkage transaction messages. Preferably, the messages are encrypted as described in U.S. patent application Ser. No. 10/253,708. Each linkage transaction message includes the logical address of the particular device sending the message. A linkage transaction message may further include information identifying whether the particular device sending the message is a controlled or controlling device. As described above, the linkage transaction messages from each controlled device further includes information relating to the service states, e.g., lamp on/off, the particular controlled device may enter. The linkage transaction messages from each controlled device may further include information relating to the current state of the device.

During a configuration session, the controlling and controlled devices participating in the session exchange respective logical addresses, and then store this address information in non-volatile memory. Controlled devices participating in the session further communicate their available service states to each controlling device participating in the session, and perhaps their current operating state as well. The controlling devices then associate the available service states, and perhaps the current operating state, of a particular controlled device with the logical address of the controlled device, and then store this information in non-volatile memory. When the configuration session ends, the devices that participated in the session will collectively function according to the "agreed upon" linkage transactions exchanged during the session.

Returning to the example introduced above, assume that the Lamp A 106 and the Switches 1 and 2 110,108 shown in FIG. 1 have been configured to functionally operate in a three-way switch configuration in the manner described above. Further assume that the Lamp is currently off. Next, assume that the Switch 1 110 is activated in the conventional manner. Unlike a conventional light switch, the smart device Switch 1 110 will reference its memory when activated to determine the logical addresses of those devices it has been configured to control. In this example, the logical address 0x38-0x02 of the Lamp A 106 is stored in the memory of the Switch 1 110, along with available service states, e.g., lamp on/off, of the Lamp A 106, and perhaps the current state of the device, e.g., "off". The Switch 1 110 next sends a control message to the Lamp A 106, addressed to the Lamp's logical address 0x38-0x02.

The control message includes a command instructing the Lamp A 106 to change its current operating state, e.g., from "off" to "on" in this example. The control message further includes the logical address of the Switch 1 110, i.e., 0x38-0x01. The control message may also include information identifying the state the Lamp A 106 is to operate in after the state change occurs, e.g., "on", although this information is not strictly required.

In response to receiving the control message from the Switch 1 110, the Lamp A 106 changes its state, either to a predetermined state or to a state identified in the control message. In this example, the Lamp A 106 will change its state to "on" whether the control message includes state information or not, since the Lamp A 106 has only two operating states, i.e., "on" or "off". After effecting the state change, the Lamp A 106 may send a status message to at least one of the devices configured to control its operation in the logical network. Recall that the logical addresses of such controlling devices are stored in non-volatile memory of the Lamp A 106 during a functional network configuration session. Thus, in this example, the Lamp A 106 may access its memory to determine the logical addresses of Switch 1 110 0x38-0x01and Switch 2 108 0x38-0x03 that have been configured to control its operation, and then may send a status message to at least one of these controlling devices using their respective logical addresses. The at least one controlling devices that receive the message may store the status information in their respective memory for future use.

The status message includes the logical address of the Lamp A 106, and information indicating that a state change has occurred in the device. The status message may further include information identifying the current operating state of the Lamp A 106, i.e., "on"—the operating state after the state change occurs, although this information is not strictly required.

The steps performed when Switch 2 108 is activated are similar to those described above in connection with the activation of Switch 1 110. Thus, the desired three-way functional operation among the Switches 1 and 2 110,108 and the Lamp A 106 is achieved without having to rewire the household, and without having to utilize a sophisticated network controller to configure and control the operation of the devices.

If a network controller is nevertheless available to the logical network, the controller may be used in a limited capacity, in conjunction with the techniques described above, to configure a functional network of devices. Because the network controller is being used in a limited capacity only to configure (not control) the functional-network using the configuration protocol described above, the need for a sufficiently skilled operator and/or user interface may be eliminated.

Figure 2:
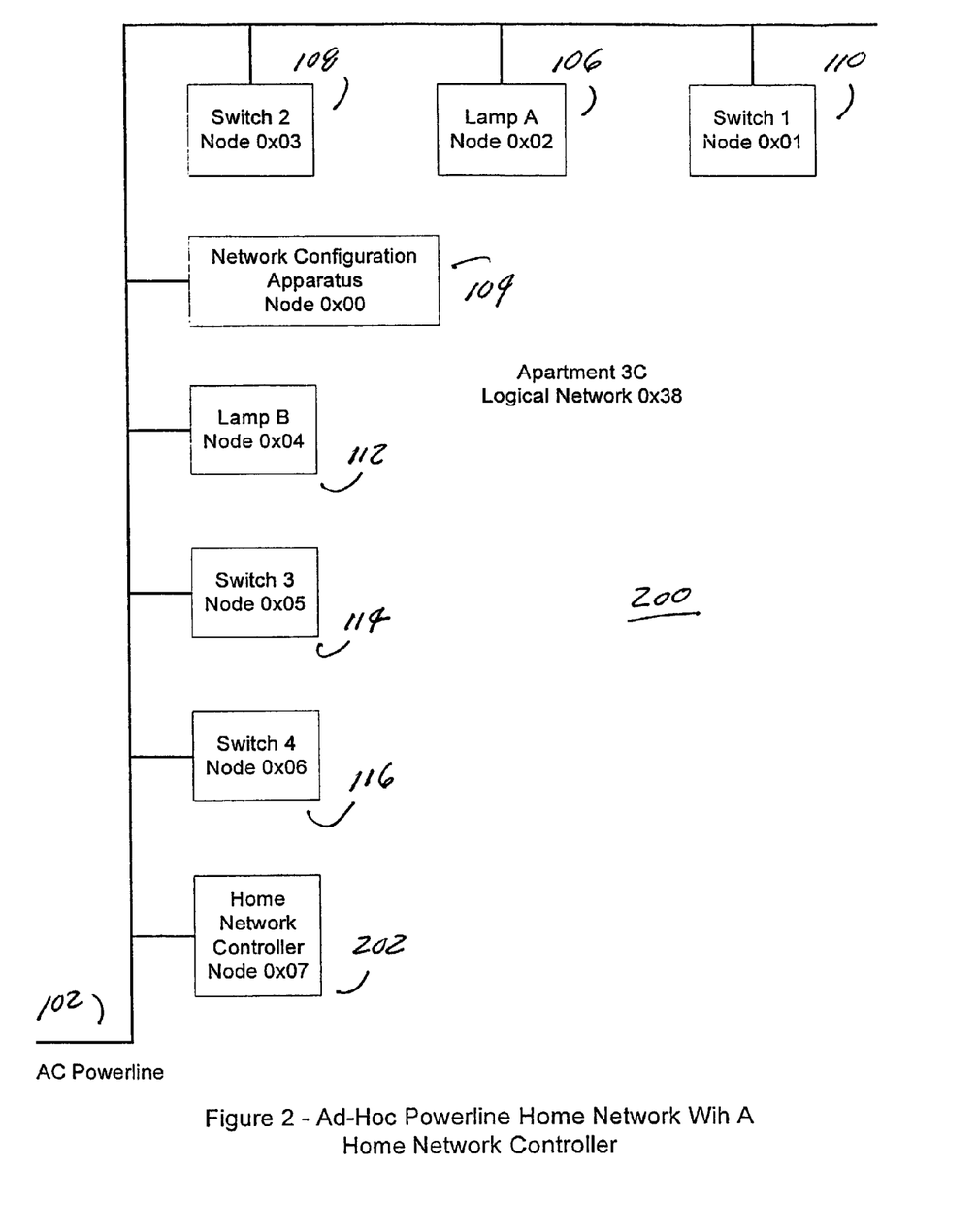
FIG. 2 depicts the arrangement of FIG. 1, adding a home network controller.

Such an arrangement is shown in FIG. 2, which depicts the arrangement of FIG. 1, adding a home network controller 202. Recall from above that the smart devices preferably wait until some triggering event occurs before performing linkage transactions with other smart devices existing on the network. It was further described that the devices may include circuitry that monitors network traffic on the bus 102 and then searches for information in the traffic to initiate the triggering event. The information used to initiate the triggering event may be transmitted by the network controller 202. This information may be addressed to those devices that are to be configured into a functional network using the devices respective logical addresses. The network controller 202 may obtain this address information in any number of ways including, but not limited to, retrieving the information from the NCA 104 or perhaps obtaining the address information from the devices themselves according to some polling routine.

Once the logical addresses of the smart devices included in the logical network 200 are known, the home network controller 202 may be used in a limited capacity to facilitate the configuration of functional networks of devices. For example, according to a first embodiment, the home network controller 202 may be programmed simply to command two or more smart devices to enter into a configuration session. The network controller 202 would do so by commanding the devices to each enter their respective configuration modes during the limited time period the other devices remain in their respective configuration modes. Once participating in a configuration session, the devices will perform linkage transactions in the same manner described above, requiring no further intervention by the network controller 202 to configure the logical network.

Alternatively, the network controller 202 may be programmed to function as a facilitator during the functional network configuration process. According to this second embodiment, the network controller 202 may be programmed to send linkage transaction messages to each of the controlled and controlling devices that are to form a particular functional network. Using the example introduced above, the network controller 202 would send linkage transaction messages to the Switches 1 and 2 110,108 that include the logical address of the Lamp A 106 and the service states, e.g., lamp on/off, of the device. The linkage transaction messages sent to the Switches 1 and 2 110,108 may further include the current operating state of the Lamp A 106, e.g., "on". The network controller 202 also sends at least one linkage transaction message to the Lamp A 106 including at least one of the logical addresses of the Switches 1 and 2 110,108 that are to control its operation. The logical addresses of each of the controlling switches may be sent to the Lamp A 106 in a single linkage transaction message or in separate linkage transaction messages.

Once linkage transaction messages have been sent to each of the devices to form the desired functional network, the devices may operate in the same ad-hoc manner as described above, requiring no further intervention by the network controller 202. It will be understood that while the functional requirements of the network controller 202 are somewhat more complex in this second embodiment than in the first embodiment described above, the programming requirements remain less complex than those required to configure and control the operation of traditional PC-centric home networks. Moreover, the smart devices themselves may require additional circuitry to enable them to interface with the home network controller 202 during the functional network configuration process. This additional circuitry may include logic needed to conform to the particular communication protocols used by the network controller 202, but the detailed description of such additional circuitry is beyond the scope of this document.

Figure 3:
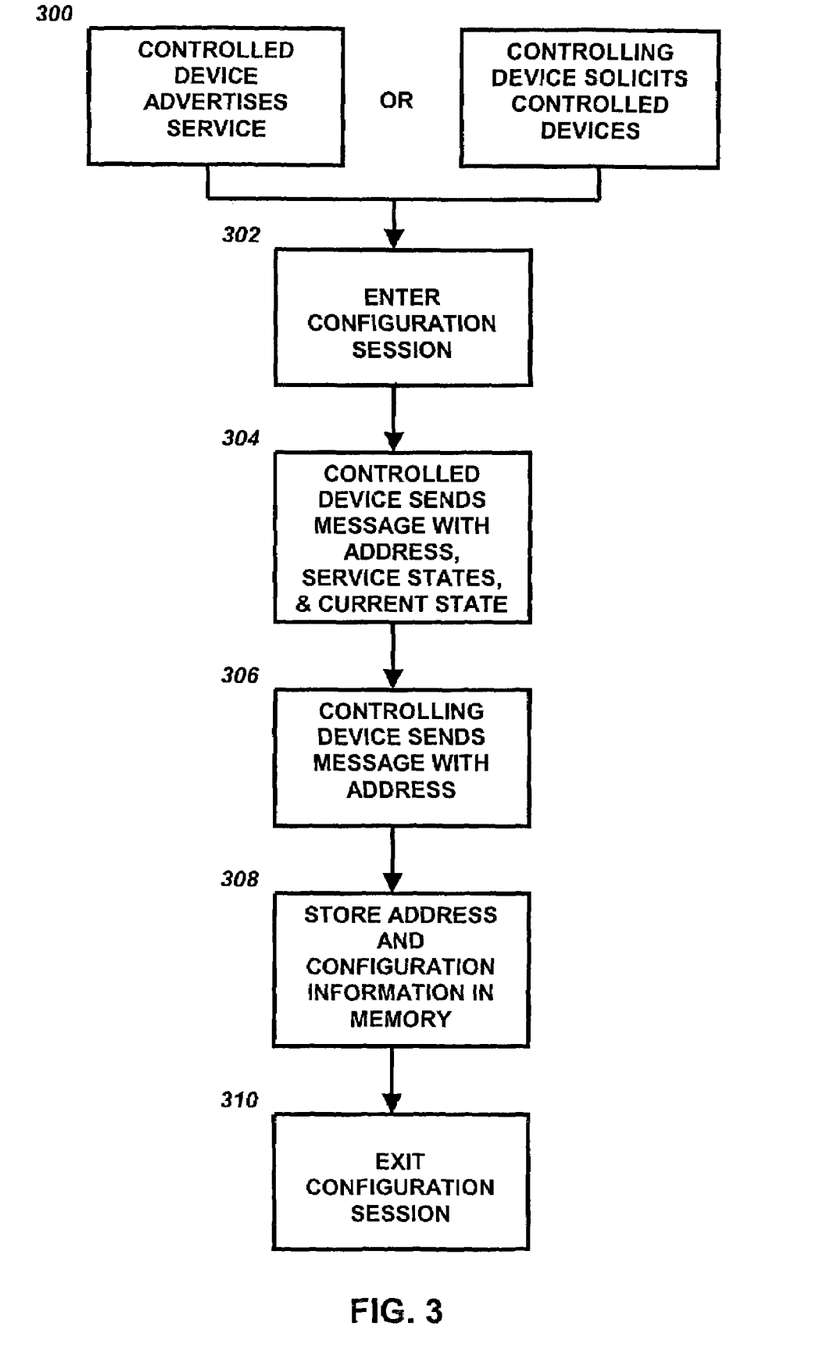
FIG. 3 is a flow diagram illustrating an exemplary method for configuring a functional network of devices.

FIG. 3 is a flow diagram illustrating an exemplary method for configuring a functional network of devices. For illustrative purposes, the method is described in conjunction with the arrangement depicted in FIG. 1, but it will be understood that the method can be employed with other arrangements of networked devices.

The method begins at step 300, where either a controlled device, e.g., Lamp A 106, advertises its service, e.g., lamp on/off, over the logical network 100 or a controlling device, e.g., Switch 1 110, solicits controlled devices to be configured into a functional network. If the controlled and controlling devices enter their respective configuration modes within a predetermined time period, the devices enter into a configuration session at step 302. While participating in the configuration session, the controlled device, e.g., Lamp A 106, sends a message at step 304 to the controlling device, e.g., Switch 1 110, including its logical address, e.g., 0x38-0x02, its available service states, e.g., lamp on/off, and perhaps its current operating state, e.g., "off". Similarly, the controlling device, e.g., Switch 1 110, sends a message at step 306 to the controlled device, e.g., Lamp A 106, including its logical address, e.g., 0x38-0x01. Each of the devices store the address and configuration information in their respective nonvolatile memory at step 308. The configuration session ends at step 310, at which time the devices form an ad-hoc functional network that remains operational until the devices are reconfigured into another functional network arrangement.

Figure 4:
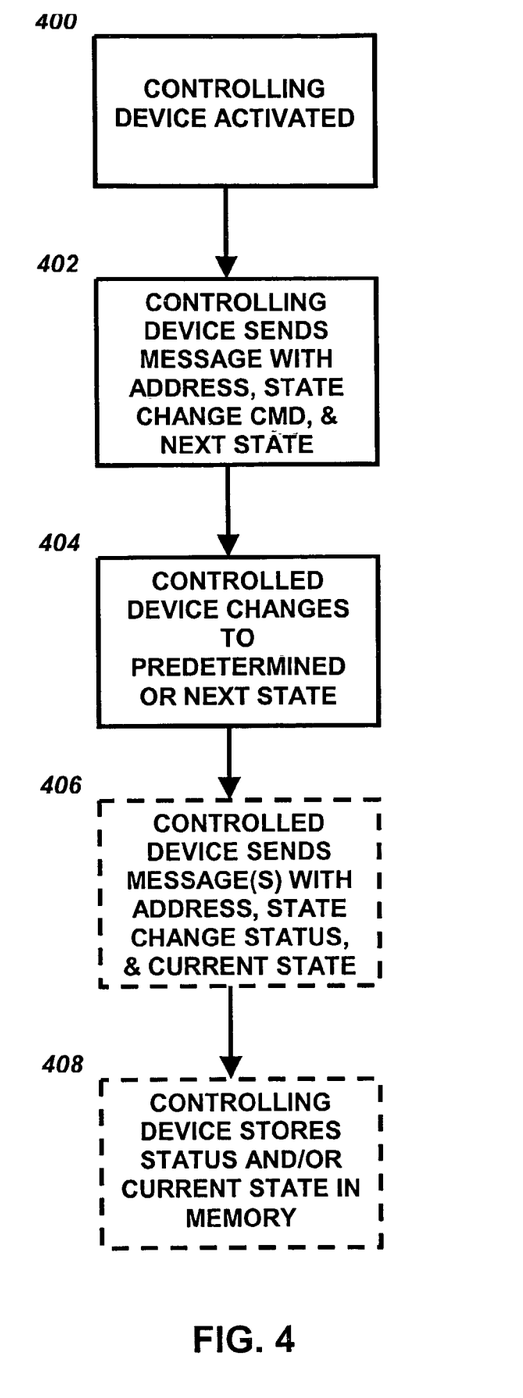
FIG. 4 is flow diagram illustrating the operation of controlling and controlled devices in a functional network.

FIG. 4 is flow diagram illustrating the operation of controlling and controlled devices in a functional network. Again, the method is described in conjunction with the arrangement depicted in FIG. 1 for illustrative purposes, but it will be understood that the method can be employed with other arrangements of networked devices. The steps of alternative embodiments are depicted in hashed boxes.

The method begins at step 400, with the activation of a controlling device, e.g., activating Switch 1 110. Upon activation, the controlling device sends a message at step 402 to all devices it has been configured to control, e.g., Lamp A 106. The message includes the address of the controlling device, a state change command (instructing the controlled device to change states), and perhaps information describing the next state that the controlled device is to change to, e.g., "on". In response to receiving the command message from the controlling device, the controlled device changes states at step 404 to either a predetermined state or the next state specified by the controlling device in the command message. The controlled device may then send a status message to at least one of the devices configured to control it at step 406. The status message includes its own logical address, a state change status (e.g., whether or not the controlled device has changed states), and perhaps the current operating state of the controlled device (e.g., the state of the controlled device after the state change has occurred). The at least one controlling device may receive the status message and then store this information in its memory for future use at step 408.

It will be appreciated that the steps of the methods illustrated above may be readily implemented either by software that is executed by a suitable processor or by hardware, such as an application-specific integrated circuit (ASIC).

Various aspects have been described in connection with a number of exemplary embodiments. To facilitate an understanding of these embodiments, many aspects were described in terms of sequences of actions that may be performed by elements of a computer system. For example, it will be recognized that in each of the embodiments, the various actions could be performed by specialized circuits or circuitry (e.g., discrete logic gates interconnected to perform a specialized function), by program instructions being executed by one or more processors, or by a combination of both.

Moreover, the exemplary embodiments can be considered part of any form of computer readable storage medium having stored therein an appropriate set of computer instructions that would cause a processor to carry out the techniques described herein.

Thus, the various aspects may be embodied in many different forms, and all such forms are contemplated to be within the scope of what has been described. For each of the various aspects, any such form of embodiment may be referred to herein as "logic configured to" perform a described action, or alternatively as "logic that" performs a described action.

Although various exemplary embodiments have been described, it will be understood by those of ordinary skill in this art that these embodiments are merely illustrative and that many other embodiments are possible. The intended scope of the invention is defined by the following claims rather than the preceding description, and all variations that fall within the scope of the claims are intended to be embraced therein.

What is claimed is:

1. A method for configuring a functional network of devices, the devices being addressable within a logical network operable on a shared physical bus, the method comprising the steps of:
   establishing a configuration session between at least one controlling device and at least one controlled device operable within the logical network, the at least one controlling and controlled devices entering respective time-limited configuration modes for an overlapping period of time to establish the configuration session;
   exchanging linkage transaction messages between the at least one controlled and controlling devices during the configuration session; and
   storing configuration information included in the linkage transaction messages in memory of the at least one controlled and controlling devices during the configuration session;
   wherein after configuration, the at least one controlled and controlling devices functionally operate according to the stored configuration information.

2. The method of claim 1, further comprising the steps of:
   the at least one controlled device advertising available service states to devices operable within the logical network when entering its respective time-limited configuration mode; and
   the at least one controlling device responding to the advertising of available services states by entering its respective time-limited configuration mode within the overlapping period of time;
   wherein the configuration session between the at least one controlled and controlling devices is established.

3. The method of claim 1, further comprising the steps of:
   the at least one controlling device soliciting devices operable within the logical network to participate in a configuration session when entering its respective time-limited configuration mode; and
   the at least one controlled device responding to the soliciting by entering its respective time-limited configuration mode within the overlapping period of time;
   wherein the configuration session between the at least one controlled and controlling devices is established.

4. The method of claim 1, wherein the at least one controlling and controlled devices enter their respective time-limited configuration modes in response to an activation of respective link switches associated each of the devices.

5. The method of claim 1, wherein the at least one controlling and controlled devices enter their respective time-limited configuration modes in response to receiving respective commands within the overlapping period of time sent from at least one other device operable within logical network.

6. The method of claim 5, further comprising the steps of:
   the at least one other device sending respective linkage transaction messages to the at least one controlled and controlling devices participating in the configuration session; and
   the at least one other device including configuration information in the respective linkage transaction messages to define the functional operation of the at least one controlled and controlling devices when the configuration session ends.

7. The method of claim 1, wherein the configuration information included in the linkage transaction messages sent to the at least one controlling device comprises:
   a logical address of the at least one controlled device; and
   information identifying available service states of the at least one controlled device.

8. The method of claim 7, wherein the configuration information included in the linkage transaction messages sent to the at least one controlling device further comprises:
   information indicating whether the device sending the linkage transaction messages is a controlling or a controlled device.

9. The method of claim 7, wherein the configuration information included in the linkage transaction messages sent to the at least one controlling device further comprises:
   a current operating state of the at least one controlled device.

10. The method of claim 1, wherein the configuration information included in the linkage transaction messages sent to the at least one controlled device comprises:
    a logical address of the at least one controlling device.

11. The method of claim 10, wherein the configuration information included in the linkage transaction messages sent to the at least one controlled device further comprises:

information indicating whether the device sending the linkage transaction messages is a controlling or a controlled device.

12. The method of claim 1, further comprising the step of:
assigning logical addresses to each of the devices operable within the logical network;
wherein the linkage transaction messages are addressed to respective logical addresses of the at least one controlled and controlling devices.

13. The method of claim 1, further comprising the step of:
encrypting the linkage transaction messages;
wherein only devices operable within the logical network are capable of decrypting the configuration information included in the linkage transaction messages.

14. An arrangement for configuring a functional network of devices, the devices being addressable within a logical network operable on a shared physical bus, the arrangement comprising:
at least one controlling device and at least one controlled device, each device operable within the logical network and connectable by the shared bus;
logic configured to enable the at least one controlling and controlled devices to enter respective time-limited configuration modes for an overlapping period of time to establish a configuration session between the devices;
a transceiver, included in each of the at least one controlling and controlled devices, configured to exchange linkage transaction messages between the respective devices during the configuration session; and
memory included in the at least one controlled and controlling devices capable of storing configuration information included in the linkage transaction messages exchanged during the configuration session;
wherein after configuration, the at least one controlled and controlling devices functionally operate according to the stored configuration information.

15. The arrangement of claim 14, further comprising:
logic, included in the at least one controlled device, configured to advertise available service states to devices operable within the logical network when the at least one controlled device enters its respective time-limited configuration mode; and
logic, included in the at least one controlling device, configured to respond to the advertising of available services states by enabling the at least one controlling device enter its respective time-limited configuration mode within the overlapping period of time;
wherein the configuration session between the at least one controlled and controlling devices is established.

16. The arrangement of claim 14, further comprising:
logic, included in the at least one controlling device, configured to solicit devices operable within the logical network to participate in a configuration session when the at least one controlling device enters its respective time-limited configuration mode; and
logic, included in the at least one controlled device, configured to respond to the soliciting by enabling the at least one controlled device to enter its respective time-limited configuration mode within the overlapping period of time;
wherein the configuration session between the at least one controlled and controlling devices is established.

17. The arrangement of claim 14, wherein the at least one controlling and controlled devices include respective link switches configured to enable the devices to enter their respective time-limited configuration modes.

18. The arrangement of claim 14, wherein the at least one controlling and controlled devices are configured to enter their respective time-limited configuration modes in response to receiving respective commands within the overlapping period of time sent from at least one other device operable within logical network.

19. The arrangement of claim 18, further comprising:
a transceiver, included in the at least one other device, configured to send respective linkage transaction messages to the at least one controlled and controlling devices participating in the configuration session; and
logic, included in the at least one other device, configured to include configuration information in the respective linkage transaction messages to define the functional operation of the at least one controlled and controlling devices when the configuration session ends.

20. The arrangement of claim 14, wherein the configuration information included in the linkage transaction messages sent to the at least one controlling device comprises:
a logical address of the at least one controlled device; and
information identifying available service states of the at least one controlled device.

21. The arrangement of claim 20, wherein the configuration information included in the linkage transaction messages sent to the at least one controlling device further comprises:
information indicating whether the device sending the linkage transaction messages is a controlling or a controlled device.

22. The arrangement of claim 20, wherein the configuration information included in the linkage transaction messages sent to the at least one controlling device further comprises:
a current operating state of the at least one controlled device.

23. The arrangement of claim 14, wherein the configuration information included in the linkage transaction messages sent to the at least one controlled device comprises:
a logical address of the at least one controlling device.

24. The arrangement of claim 23, wherein the configuration information included in the linkage transaction messages sent to the at least one controlled device further comprises:
information indicating whether the device sending the linkage transaction messages is a controlling or a controlled device.

25. The arrangement of claim 14, further comprising:
a network configuration apparatus configured to assign logical addresses to each of the devices operable within the logical network;
wherein the linkage transaction messages are addressed to respective logical addresses of the at least one controlled and controlling devices.

26. The arrangement of claim 14, further comprising:
in each of the respective at least one controlled and controlling devices, logic configured to encrypt the linkage transaction messages;
wherein only devices operable within the logical network are capable of decrypting the configuration information included in the linkage transaction messages.

* * * * *